United States Patent [19]

Fukushima et al.

[11] Patent Number: 4,909,534

[45] Date of Patent: Mar. 20, 1990

[54] ACTIVELY CONTROLLED AUTOMOTIVE SUSPENSION SYSTEM WITH VARIABLE DAMPING COEFFICIENT AND/OR SPRING COEFFICIENT

[75] Inventors: Naoto Fukushima; Hirotsugu Yamaguchi; Yohsuke Akatsu; Sunao Hano, all of Kanagawa, Japan

[73] Assignee: Nissan Motor Company, Limited, Yokohama, Japan

[21] Appl. No.: 60,909

[22] Filed: Jun. 12, 1987

[30] Foreign Application Priority Data

Jun. 12, 1986 [JP] Japan ................................ 61-137107

[51] Int. Cl.[4] ............................................. B60G 17/08
[52] U.S. Cl. .................................. 280/707; 280/6.12; 280/714
[58] Field of Search ............... 280/6 H, 707, 714, 6.12

[56] References Cited

U.S. PATENT DOCUMENTS

| 4,185,845 | 1/1980 | Misch et al. | 280/6 H |
| 4,364,574 | 12/1982 | Saito | 280/707 |
| 4,573,705 | 3/1986 | Kanai et al. | 280/707 |

FOREIGN PATENT DOCUMENTS

220674  5/1987  European Pat. Off. ............ 280/707

Primary Examiner—Kenneth R. Rice
Attorney, Agent, or Firm—Foley & Lardner, Schwartz, Jeffrey, Schwaab, Mack, Blumenthal & Evans

[57] ABSTRACT

An actively controlled suspension system is provided with a fluid pressure device provided between a vehicle body and a suspension member for suspending the vehicle body on the suspension member. The fluid pressure member is variable at least one of damping characteristics and spring characteristics in linear fashion depending upon relative displacement of the vehicle body and the suspension member in bounding and rebounding directions.

9 Claims, 5 Drawing Sheets

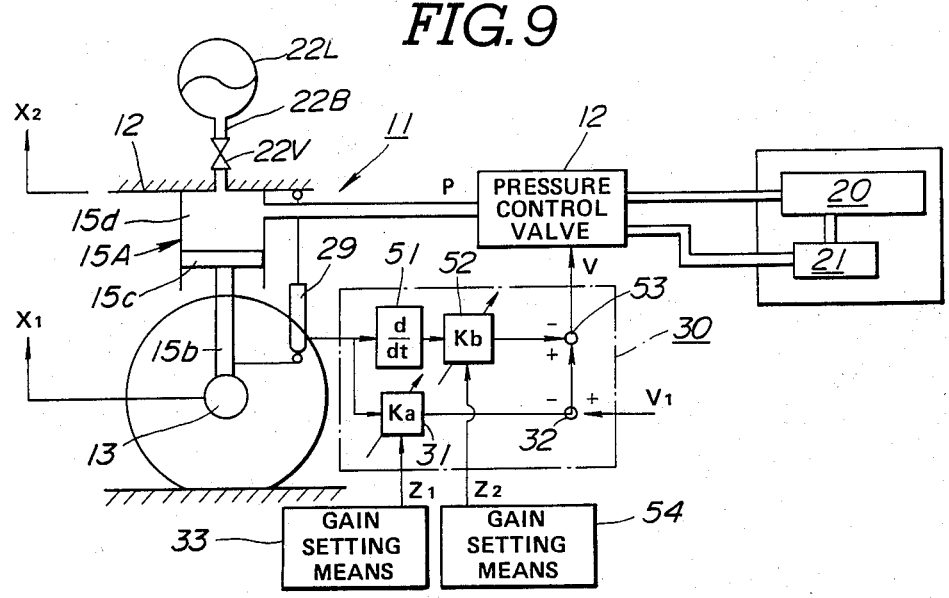
FIG. 9
FIG. 10
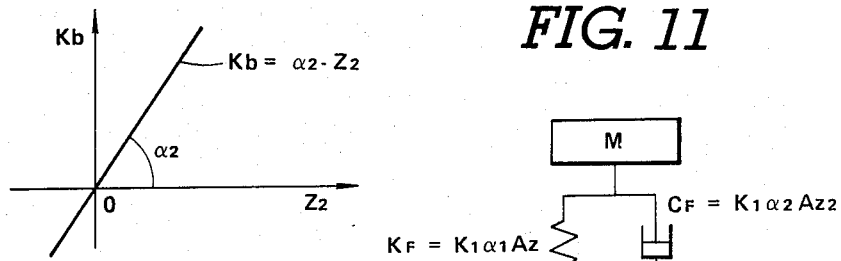
FIG. 11
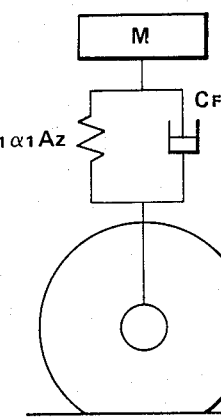
FIG. 12
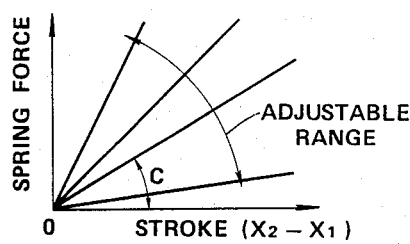

ACTIVELY CONTROLLED AUTOMOTIVE SUSPENSION SYSTEM WITH VARIABLE DAMPING COEFFICIENT AND/OR SPRING COEFFICIENT

BACKGROUND OF THE INVENTION

1. Field of the Invention

The present invention relates generally to an actively controlled suspension system which positively adjusts fluid pressure in a suspension assembly for absorbing vibrations, such as road shock and so forth and suppressing a change of attitude of the vehicle body. More specifically, the invention relates to an actively controlled suspension system which is adjustable in terms of spring coefficient and/or damping coefficient according to predetermined control parameters.

2. Description of the Background Art

Generally, a typical construction of a suspension assembly comprises a suspension coil and shock absorber and is interposed between a vehicle body and a suspension member supporting a vehicular wheel, in order to constitute an automotive suspension system with the suspension member. The suspension coil spring generally resists against load applied to maintain the vehicle body and the road wheel in a predetermined positional relationship to each other. On the other hand, the shock absorber is intended to damp or absorb vibrations transmitted between the vehicle body and the road wheel. The automotive suspension system may be further provided with a roll-stablizer for suppressing vehicular rolling motion.

Some of the many kinds of automotive suspension systems include hydraulic circuits associated with fluid chambers in hydraulic shock absorbers for the controlling balance between the fluid pressures in the fluid chambers according to the relative displacement between the vehicle body and road wheel. Such hydraulic circuits include a fluid pressure source supplying working fluid at a given pressure to the circuits, and pressure control valves. The pressure control valves hydraulically connect and disconnect the fluid pressure source to the fluid chambers of the hydraulic shock absorbers for controlling pressure supply. The pressure control valves are controlled by an electric or electronic control system which switches the various valve positions to selectively introduce or drain fluid pressure into or from the fluid chambers so as to generate a damping force which suppresses vehicle body and road wheel vibrations.

These conventional positively controlled suspension systems encounter various defects and have not been at all satisfactorily capable of suppressing vibrations or bouncing of the vehicle body in order to ensure riding comfort. Specifically, conventional systems produce a damping force by means of an orifice in the hydraulic circuit. However, due to flow resistance through the orifice, fluid pressure differences between the fluid chambers in the shock absorber cannot be easily balanced. When the balance is disturbed, the shock absorber tends to transmit vibration of the road wheel to the vehicle body which degrades riding comfort.

In order to provide an improvement, a positively or actively controlled automotive suspension system has been proposed in European Patent First Publication 01 93 124, published on Sept. 3, 1986, and assigned to the common owner of the present invention. The proposed positively controlled automotive suspension system comprises a hollow cylinder defining a chamber, a piston thrustingly received within the chamber of the cylinder and defining therein a first and second fluid chambers, both filled with a working fluid, the piston being free to move axially within the chamber, a fluid pressure source, a hydraulic circuit connecting the first and second fluid chamber and the fluid pressure source, a pressure control valve disposed within the hydraulic circuit and adapted to selectively establish and block fluid communication between the first and second fluid chamber and the fluid pressure source, means responsive to relative displacement between a vehicle body and road wheel assembly out of a predetermined normal range, for controlling the pressure control valve so as to adjust the fluid pressure in the first and second fluid chambers in order to adjust the relative distance between the vehicle body and the road wheel assembly back to within the predetermined normal range, and means responsive to bounding and rebounding motion of the road wheel relative to the vehicle body, for controlling the pressure control valve so as to adjust the fluid pressure in the first and second fluid chambers to assist smooth displacement of the piston within the cylinder thereby absorbing bounding and rebounding energy which would otherwise be transmitted to the vehicle body.

Another type of active suspension system has been disclosed in 'Autocar' published by Haymarket Publishing Ltd., on Sept. 10, 1987. The disclosed system includes a single cylinder actuator which has a cylinder tube connected to the vehicle body and a piston with a piston rod connected to the suspension member. The cylinder actuator is connected to a hydraulic pressure source via an electromagnetic valve. The hydraulic cylinder is also connected to an accumulator via an orifice. With the construction, the pressurized fluid to absorb road shock and suppress attitude change of the vehicle body has been supplied from the pressure force via the pressure control valve. This lowers responsibility of pressure control in the hydraulic actuator.

Though the foregoing type suspension systems are adjustable in terms of the damping characteristics of the suspension system for absorbing road shock and suppressing attitude change. On the other hand, there are some conventional suspension system which are adjustable in terms of vehicular height. Some of the height adjustable suspension systems control the vehicular attitude by adjusting the vehicular height. Among various height adjustable suspension systems, some systems are constructed to facilitate adjustable spring characteristics. However, in the prior art, it was not achieved to adjust the spring characteristics in linear fashion with a satisfactrorily wide adjustment range.

SUMMARY OF THE INVENTION

Therefore, it is an object of the present invention to provide an actively controlled suspension system which provides linear adjustment characteristics of a spring force and/or damping force.

In order to accomplish the aforementioned and other objects, an actively controlled suspension system, according to the invention, is provided with a fluid pressure means provided between a vehicle body and a suspension member for suspending the vehicle body on the suspension member. The fluid pressure member varies at least one of the damping characteristics and spring characteristics in linear fashion depending upon relative displacement of the vehicle body and the suspension member in bounding and rebounding directions.

According to one aspect of the invention, an actively controlled suspension system comprises a fluid pressure means interposed between a vehicle body and a suspension member rotatably supporting a road wheel, the fluid pressure means having a variable pressure chamber, a sensor means for monitoring relative distance between the vehicle body and the suspension member for producing a sensor signal indicative thereof, a controller receiving the sensor signal and deriving a control signal based on the sensor signal value and a given value for adjusting the fluid pressure in the variable pressure chamber in order to maintain the relative distance between the vehicle body and the suspension member at a predetermined value, and means associated with the controller, for varying the given value according to a set value thereof, the set value being set for adjusting the given value in proportion to the set value linear fashion so that the control signal value can be varied in linearly according to variation of the given value.

In the preferred construction, the fluid pressure means comprises a fluid cylinder enclosing a thrusting piston, the fluid cylinder being rigidly connected to one of the vehicle body and the suspension member, the piston being connected to the other of the vehicle body and the suspension member via a piston rod, and the variable pressure chamber being defined by the fluid cylinder and the piston, a fluid pressure source, and a pressure control valve disposed between the variable pressure chamber and the fluid pressure source, the pressure control valve being responsive to the control signal to adjust the fluid pressure in the variable pressure chamber.

The controller detects relative displacement from a predetermined reference position between the vehicle body and the suspension member for deriving the control signal value to adjust the fluid pressure in the variable pressure chamber for reducing the relative displacement to zero. The controller derives a spring coefficient indicating value based on the sensor signal for deriving the control signal value based thereon for adjusting spring characteristics of the suspension system. In the alternative, the controller derives a damping coefficient indicative value based on the sensor signal for deriving the control signal value based thereon to adjust damping characteristics of the suspension system.

Further preferably, the given value varying means is manually operable for adjusting the given value.

BRIEF DESCRIPTION OF THE DRAWINGS

In the drawings:

FIGS. 4(A) and 4(B) are enlarged sections showing the detail of the hydraulic pressure control valve of FIG. 3, in which, FIG. 4(A) shows the valve position softening the shock absorber and FIG. 4(B) shows the valve position hardening the shock absorber;

FIG. 9 is a diagramatic illustration of the preferred embodiment of one of the active suspension systems employed in the preferred embodiment of the actively controlled suspension system according to the invention;

FIG. 10 is a graph showing variation of a value depending upon bounding and rebounding stroke in relative displacement between a vehicle body and a suspension member;

FIG. 11 is an explanatoary illustration of an equivalent model showing kinematic operations of the preferred embodiment of the active suspension system according to the invention; and FIG. 12 is a graph showing variation of spring force in relation to the stroke of the relative displacement between the vehicle body and the suspension member.

DESCRIPTION OF THE PREFERRED EMBODIMENT

Figure 1:
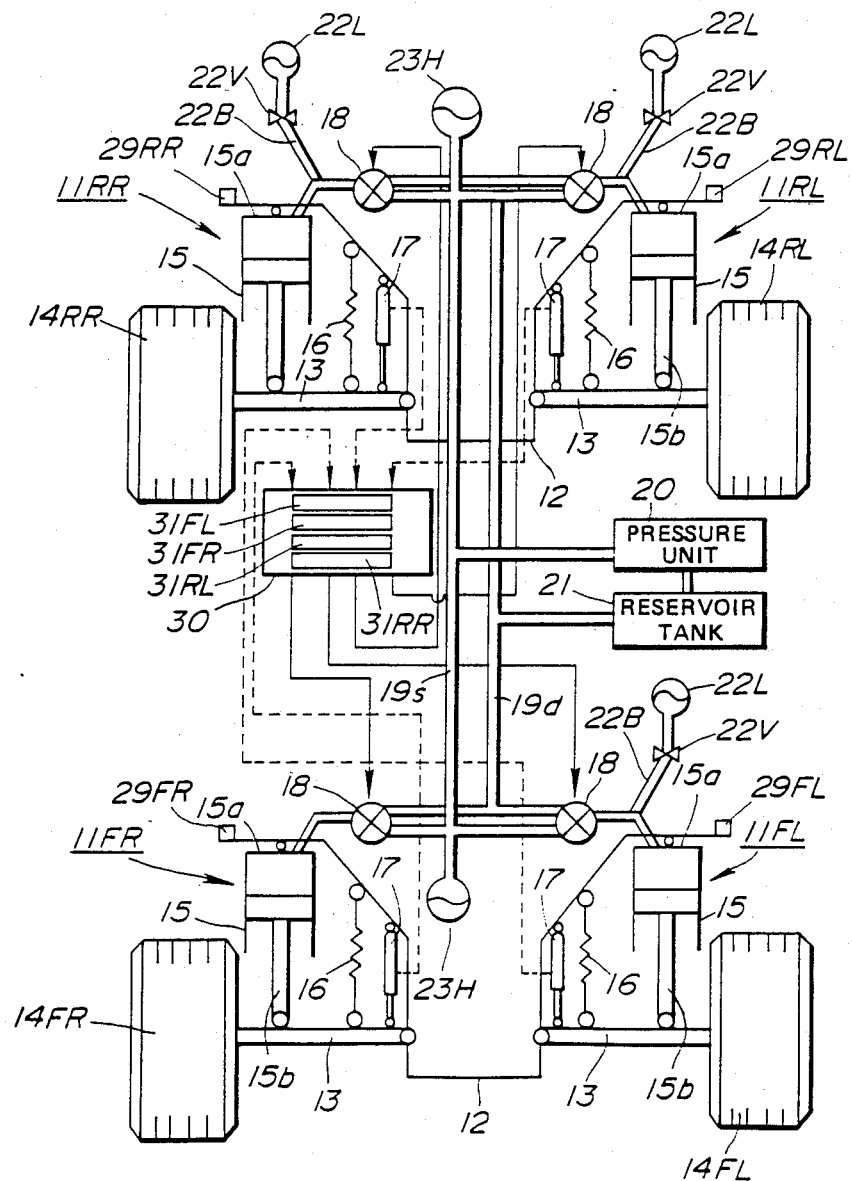
FIG. 1 is a diagrammatical illustration showing the overall construction of the preferred embodiment of an automotive suspension system with a control system actively controlling the suspension system according to the present invention.

Referring now to the drawing, particularly to FIG. 1, a vehicle has four suspensions systems 11FL, 11FR, 11RL and 11RR for respectively suspending vehicle body 12 on front-left, front-right, rear-left and rear-right road wheels 14FL, 14FR, 14RL and 14RR. Each of the front-left, front-right, rear-left and rear-right suspension systems 11FL, 11FR, 11RL and 11RR are constructed to form so-called active suspension system which adjusts working fluid pressure in the suspension system for adjusting stiffness and damping characteristics of the suspension system in positive manner for absorbing discomfortable relatively high frequency and relatively small magnitude vibration input from the road wheels 14FL, 14FR, 14RL and 14RR and suppressing attitude change of a vehicle body.

Each suspension system 11FL, 11FR, 11RL and 11RR comprises a suspension member 13, such as a suspension link, a suspension arm and so forth, and a suspension assembly 15 which is interposed between the vehicle body 12 and the suspension member 13. The suspension assembly 15 has a hydraulic cylinder 15A which serves as an actuator, and a coil spring 16. In the shown embodiment, the suspension coil spring 16 is not necessary to damp the bounding and rebounding kinematic energy and is required only to resiliently support the vehicle body on the road wheel resisting the static load due to the mass weight of the vehicle body. In the further positive side, the suspension coil spring 16 should be weak enough not to produce damping force against vibrations to be transmitted between the vehicle body and the suspension member.

The hydraulic cylinder 15A has a hollow cylinder housing 15a filled with a viscous working fluid and a piston 15c sealingly and thrustingly disposed within the internal space of the cylinder housing to divide the cylinder space into upper and lower fluid chambers 15d and 15e. A piston rod 15b extends through one end of the cylinder housing 15a. The other end of the cylinder housing 15a is connected to one section of the vehicle body 12. The lower end of the piston rod 15b is connected to the suspension member 13. Therefore, the piston 15c is thrustingly movable in bounding and rebounding directions relative to the cylinder housing 15a according to relative displacement between the vehicle body and the suspension member.

The hydraulic cylinder 15A of the suspension assembly 15 is connected to a hydraulic pressure source unit 20 via a hydraulic circuit which includes pressure control valve 18. The pressure control valve 18 employed in the shown embodiment is provided with an electrically operable actuator electrically operable according to a suspension control signal and connected to a control unit 30 to receive the suspension control signal therefrom. The hydraulic circuit includes a supply line 19s and a drain line 19d. High pressure accumulators 23H are connected to the supply line 19s and a low pressure accumulator 22L are connected between the pressure control valves 18 and the associated hydraulic cylinder 15A. The pressure source unit comprises a pressure unit 20 and a reservoir tank 21. The pressure unit 20 is connected to the reservoir tank 21 to suck the viscous working fluid in the reservoir tank 21 to feed to the pressure control valve 18 via the supply line 19s. On the other hand, the drain line 19d is connected to the reservoir 21 to return the working fluid thereto.

Figure 2:
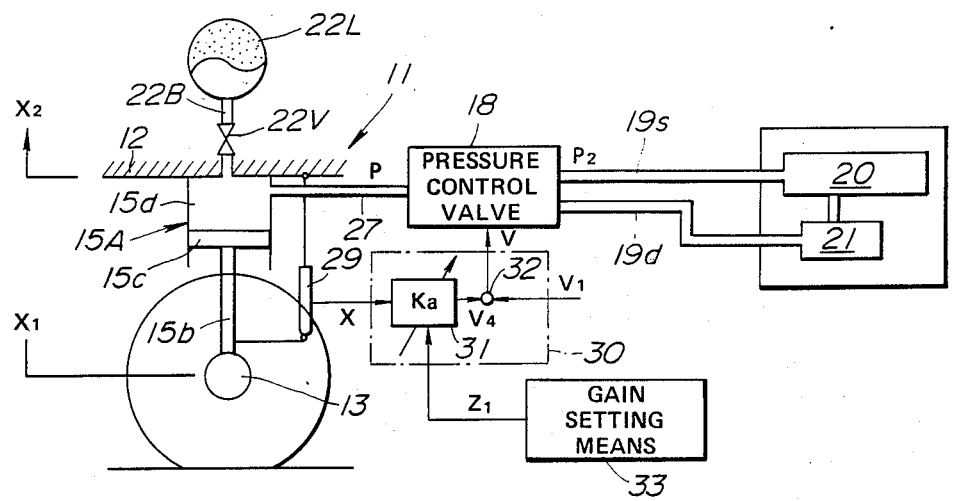
FIG. 2 is a diagramatic illustration of the preferred embodiment of one of the active suspension systems employed in the preferred embodiment of the actively controlled suspension system according to the invention.

As seen from FIGS. 1 and 2, the low pressure accumulator 22L are connected to a branch pressure line 22B connected to the communication path 27 between the pressure control valves 18 and the upper fluid chambers 15d of the hydraulic cylinder 15A. A throttle valve 22V is inserted between the junction of the branch pressure line 22B and the communication path 27 and the low pressure accumulator 22L. The throttle valve 22V has a fixed throttling rate to provide a predetermined flow resistance against the working fluid flow therethrough.

The controller 30 is connected to a bounding and rebounding stroke sensors 29FL, 29FR, 29RL and 29RR. The bounding and rebounding stroke sensors 29FL, 29FR, 29RL and 29RR are respectively located just above the front-left, front-right, rear-left and rear-right wheels 14FL, 14FR, 14RL and 14RR to output bounding and rebounding stroke indicative signals $L_{FL}$, $L_{FR}$, $L_{RL}$ and $L_{RR}$. The controller 30 derives the suspension control signals for controlling respective pressure control valves 18 based on the bounding and rebounding stroke indicative signals $L_{FL}$, $L_{FR}$, $L_{RL}$ and $L_{RR}$.

Figure 3:
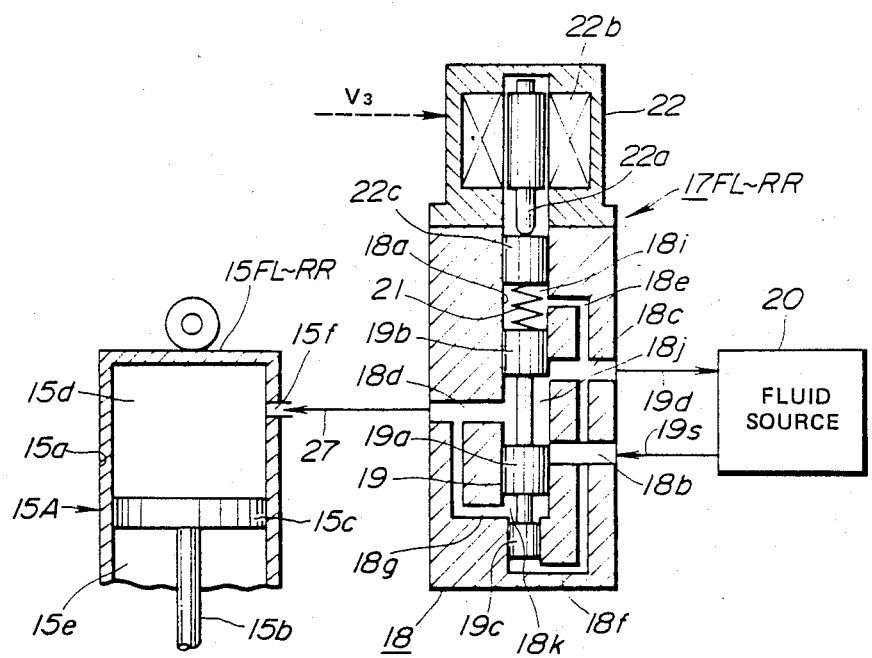
FIG. 3 is a section of one example of a hydraulic cylinder in combination with a hydraulic pressure control valve associated with the shock absorber for adjusting stiffness of the latter.

FIG. 3 shows the detailed construction of the hydraulic cylinder 15A and the pressure control valve 18. As will be seen from FIG. 3, the hollow cylinder housing 15a is formed with a port 15f communicating the upper fluid chamber 15d to an outlet port 18d of the pressure control valve 18 via a communication line 27. The pressure control valve 18 has a valve housing 18A having the forementioned outlet port 18d, an inlet port 18b and a drain port 18c. Respective inlet port 18b, the drain port 18c and the outlet port 18d are connected to a valve bore 18a defined within the valve housing 18A. A valve spool 19 is disposed within the valve bore 18a for thrusting movement therein. The valve spool 19 has first, second and third lands 19a, 19b and 19c. As will be seen from FIG. 3, the third land 19c has smaller diameter than that of the first and second lands 19a and 19b. The third land 19c defines a fifth pressure control chamber 18h which is connected to the drain port 18c via a drain path 18f. An actuator piston 22c is also disposed within the valve bore 18a. The actuator piston 22c opposes the second land 19b in spaced apart relationship to define a second pressure control chamber 18i which is connected to the drain port 18c via a drain path 18e. An annular pressure chamber 18j is defined between the first and second lands 19a and 19b. The pressure chamber 18j is constantly communicated with the outlet port 18d and whereby communicated with the upper fluid chamber 15d. On the other hand, the pressure chamber 18j shifts according to shifting of the valve spool 19 to selectively communicate with the inlet port 18b and the drain port 18c. A pressure control chamber 18k is defined between the first and third lands 19a and 19c. The pressure control chamber 18k is in communication with the outlet port 18d via a pilot path 18g. A bias spring 22d is interposed between the actuator piston 22c and the valve spool 19. The spring force of the bias spring 22d balances with the hydraulic pressure in the pressure control chamber 18k to determine the valve spool position. The actuator piston 22c contacts with an actuator rod 22a of an electrically operable actuator 22 which comprises an electromagnetic solenoid. The solenoid 22 is a proportioning solenoid which varies magnitude of actuation of the actuator rod 22a to determine the valve spool position.

Figure 4:
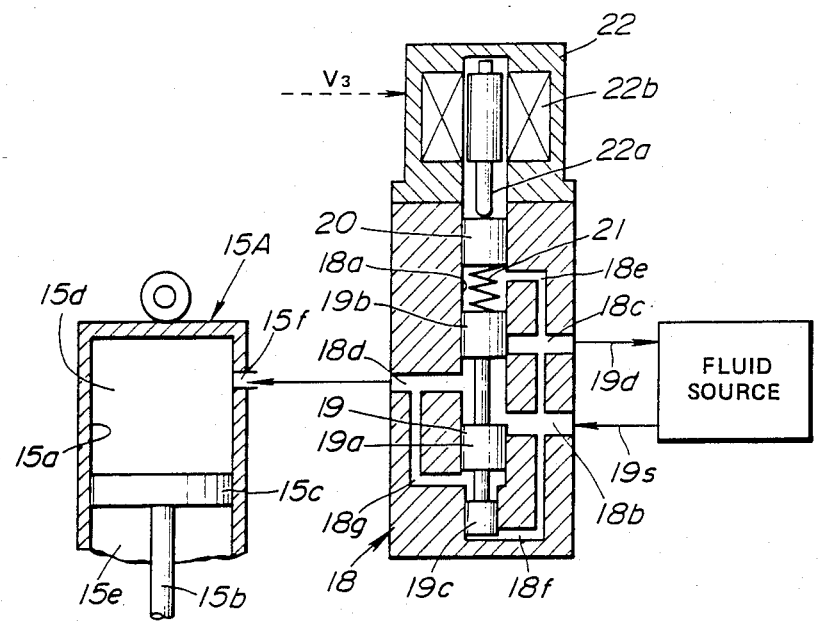
Figure 4:
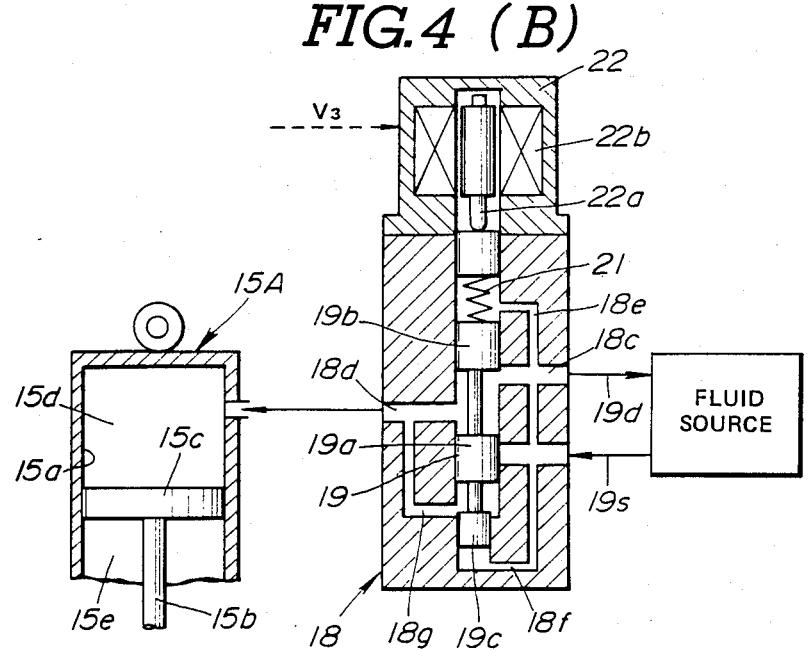

In order to increase the supply pressure of the working fluid, the spool valve 19 is shifted to the position shown in FIG. 4(A) to increase path area at a throttle constituted at the inner end of the inlet port 18b by means of the land 19a of the spool valve 19. On the other hand, in order to decrease the supply pressure of the working fluid, the spool valve is shifted to the position shown in FIG. 4(B) to decrease the path area at the throttle of the inner end of the inlet port 18b and opens the drain port 18 which is normally blocked by means of the land 19b of the spool valve.

Construction of the pressure control valves should not be specified to the construction as illustrated in FIGS. 3, 4(A) and 4(B) but can be relaced with any appropriate constructions. For example, the pressure control valve constructions as illustrated in European Patent First Publication 01 93 124, set forth above, can also be employed. The disclosure of the aforementioned European Patent First Publication 01 93 12 is herein incorporated by reference for the sake of disclosure.

Figure 5:
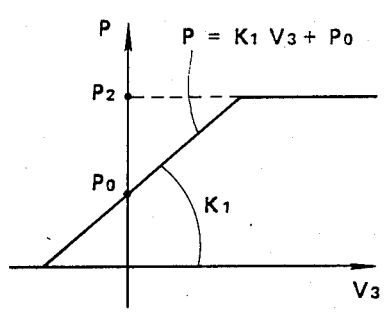
FIG. 5 is a graph showing variation of a working fluid pressure in relation to a suspension control signal.

As seen from FIG. 3, the proportioning solenoid 22 comprises the actuator rod 22a and a solenoid coil 22b. The solenoid coil 22b is energized by suspension control signal $V_3$ from the controller 30. Magnitude of energization is variable depending upon the signal level of the suspension control signal. Therefore, the proportioning solenoid 22 shifts the actuator rod in a magnitude proportional to the suspension control signal level. In the shown embodiment of the pressure control valve, the working fluid pressure P at the outlet port 18d is variable according to the characteristics shown in FIG. 5. Namely, when the suspension control signal $V_3$ is zero, the pressure P at the outlet port 18 becomes $P_0$ determined according to a predetermined offset pressure $P_0$. When the suspension control signal value in positive value increases, the fluid pressure P at the outlet port 18$d$ increases with a predetermined proportioning gain $K_1$. Namely, by increasing of the suspension control valve $V_3$, the actuator rod 22$a$ is driven downwardly in FIG. 3 at a magnitude toward to position of FIG. 4(A) to achieve increasing of the fluid pressure with the predetermined proportioning gain $K_1$. The fluid pressure P at the outlet port 18$d$ saturate at the output pressure $P_2$ of the pressure unit 20. On the other hand, when the suspension control signal value $V_3$ decreases, the pressure P decreases to zero to by shifting of the actuator rod 22$a$ toward the direction to FIG. 4(B).

The actuator rod 22$a$ of the proportioning solenoid 22 is associated with the actuator piston 22$c$. Contact between the actuation rod 22$a$ and the actuator piston 22$c$ can be maintained by the resilient force of the bias spring 22$d$ which normally biases the actuator piston toward the actuation rod. On the other hand, the spring force of the bias spring 22$d$ is also exerted on the valve spool 19 to constantly bias the valve spool downwardly in FIG. 2. The valve spool 19 also receives upward hydraulic force from the pressure control chamber 18$k$. Therefore, the valve spool 19 is oriented at the position in the valve bore at the position where the downward bias of the bias spring 22$d$ balances with the upward hydraulic force of the pressure control chamber 18$k$.

Here, the communication path 27, the outlet port 18$d$, the fluid chamber 15$d$ of the hydraulic cylinder 15A and the pressure control valve 18 constitutes the first hydraulic system. On the other hand, the low pressure accumulator 22L, the branch line 22B and the throttle valve 22V constitute the second hydraulic system with the fluid chamber 15$d$ of the hydraulic cylinder 15A. The length and diameter of the pipe forming the communication path 27 may be so selected as to generate a resistance $C_2$ against the working fluid flow therethrough. The flow resistance $C_2$ may vary according to input vibration frequency which corresponds to the stroke speed of the piston 15$c$ of the hydraulic cylinder 15A in non-linear fashion. The variation characteristics of the flow resistance $C_2$ in the communication path 27 may be parabolic characteristics in relation to the vibration frequency. Further preferably, the flow resistance value $C_2$ of the communication path may be set smaller than the flow resistance $C_1$ in the second hydraulic system set forth above, when the input vibration frequency is lower than a boader frequency $f_0$, e.g. 7 to 8 HZ) between the resonance frequency of the vehicle body and the resonance frequency of the suspension member as coupled with the road wheel. On the other hand, the flow resistance value $C_2$ of the communication path is set greater than or equal to the flow resistance $C_1$ in the second hydraulic system set forth above, when the input vibration frequency is higher than or equal to the boader frequency $f_0$.

As will be appreciated, in general, the resonance frequency of the suspension member with the road wheel is higher than the resonance frequency of the vehicle body. Therefore, when the vibration is input from the suspension member, the vibration frequency is usually higher than the boader frequency $f_0$. On the other hand, when the vehicle body causes rolling, pitching, bouncing or so forth to input vibration, the vibration frequency is lower than the broader frequency. Since the flow resistance of the communication path 27 becomes greater than that of the second hydraulic system when the vibration is input from the suspension member. Therefore, in this case, the second hydraulic system becomes active to absorb vibration energy. On the other hand, when the vibration frequency is lower than the boader frequency $f_0$ during vehicular attitude change, such as vehicular rolling, pitching and bouncing and so forth, the first hydraulic system is active to adjust the fluid pressure in the fluid chamber 15$d$ to suppress attitude change of the vehicle body.

For example, when bounding motion occurs at the suspension member, the piston 15$c$ of the hydraulic cylinder 15A shifts upwardly to cause increasing of the fluid pressure in the upper chamber 15$d$. Since the input vibration frequency is higher than the broader frequency, the increased pressure is introduced into the low pressure accumulator 22L through the throttle valve 22V because that the second hydraulic circuit has lower flow resistance $C_1$ than that of the first hydraulic circuit. In this case, the throttle valve generates damping force against the piston stroke to successfully prevent the vibration energy input from the suspension member from being transmitted to the vehicle body.

Therefore, in response to the bounding motion of the suspension member causing increasing of the fluid pressure in the fluid chamber 15$d$, the pressurized fluid flows from the fluid chamber 15$d$ to the low pressure accumulator 22L via the branch line 22B and the throttle valve 22V. Since the throttle valve 22V has a given throttling rate to limit fluid flow therethrough, this flow resistance serves as damping force for absorbing vibration energy so that the vibration energy is not transmitted to the vehicle body.

Figure 6:
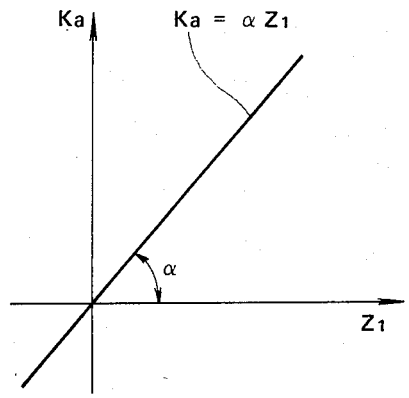
FIG. 6 is a graph showing variation of a value depending upon bounding and rebounding stroke in relative displacement between a vehicle body and a suspension member.

On the other hand, in response to the low frequency vibration generated due to vehicle body attitude change, the aforementioned second hydraulic system is active to suppress the attitude change of the vehicle body. In order to control the pressure control valve 18 in the second hydraulic system, the controller 30 derives the control signal for determining the fluid pressure in the fluid chamber 15$d$ of the hydraulic cylinder 15A. The controller 30 comprises a bounding and bounding stroke dependent value derivation circuit 32, a subtractor circuit 32, as shown in FIG. 6. The bounding and rebounding stroke dependent value derivation circuit 31 receives the bounding and rebounding stroke indicative signal from the associated stroke sensor 29. The bounding and rebounding stroke dependent value derivation circuit 31 is, on the other hand, set a predetermined gain value Ka to derive the bounding and rebounding stroke dependent value (Ka$\times$L) on the basis of the bounding and rebounding stroke indicative signal value L. This bounding and rebounding stroke dependent value constitues a component in the suspension control signal to determine a spring coefficient of the suspension system. It will be preferable to allow manual adjustment of the spring coefficient of the suspension system by a driver or user for fitting the suspension feeling to the driver's or user's taste. Adjustment of the spring coefficient can be achieved by varying the gain value Ka for deriving the bounding and rebounding stroke dependent value. Therefore, in the preferred construction, the gain value Ka may be variable. For enabling to vary the gain value Ka, the shown embodiment of the active suspension control system has a spring coefficient setting means 33 which is manually operable for varying the set gain value Ka. The spring coefficient setting means 33 outputs a set gain value indicating signal $Z_1$ which represents desired spring coefficient of the suspension system. As shown in FIG. 6, the gain value Ka varies in linear fashion according to increasing of the set gain value indicating signal value $Z_1$. The bounding and rebounding stroke dependent value derivation circuit 31 thus varies the gain value Ka and multiplies the bounding and rebounding stroke indicating sensor signal value L by the determined gain value Ka to determine the bounding and rebounding stroke dependent value. The bounding and rebounding stroke dependent value derived by the bounding and rebounding stroke dependent value derivation circuit 31 is fed to an inverting input terminal of the sutractor circuit 32. The adder circuit 32 also has a non-inverting input terminal connected to a target vehicle height setting means 32a which produces a target vehicle height indicative signal $V_1$. The subtractor circuit 32 subtracts the bounding and rebounding stroke dependent value from the target vehicle height indicative signal value $V_1$ to derive a difference indicative signal $\Delta V_1$.

In the arrangement set forth above, when the vehicle travels on the smooth road in steady condition where no vehicular rolling, pitching or bouncing occurs, the actual vehicle height as represented by the bounding and rebounding stroke indicative sensor signal value is substantially maintained at the target vehicle height level as represented by the target vehicle height indicating signal value $V_1$. Therefore, output of the bounding and rebounding stroke dependent value derivation circuit 31 is held substantially at $V_1$. As a result, the output of the bounding and rebounding stroke dependent value derivation circuit 31 is held at a value corresponding to the target vehicle height indicating value $V_1$. Therefore, the subtractor output from the subtractor circuit 32 becomes zero. Therefore, the pressure control valve 18 is held in place where the hydraulic force created by the fluid pressure in the fluid chamber 15d of the hydraulic cylinder 15A balances with the mass weight of the vehicle body as applied to the suspension system to maintain the vehicle height at the target vehicle height as represented by the target vehicle height indicating signal value $V_1$.

On the other hand, when nose-dive occurs due to vehicular braking operation, the front end of the vehicle body is lowered with compressing the hydraulic cylinders to increase the fluid pressure in the fluid chamber. This causes the working fluid in the fluid chamber to flow back to the outlet port 18c of the pressure control valve 18 to cause increasing of the fluid pressure in the pressure control chamber 18k. Increasing the fluid pressure in the pressure control chamber 18k overcomes the spring force of the bias spring 22d to allow upward shifting of the valve spool 19, in FIG. 2, to establish communication between the outlet port 18c and the drain port 18b to drain the increased pressure to the fluid reservoir 21. Therefore, the fluid pressure in the upper fluid chamber 15d can be maintained at the set pressure P which balances with the spring force of the bias spring 22d.

At the same time, lowering of the front end of the vehicle body is detected by the bounding and rebounding stroke sensors 29FL and 29FR. The bounding and rebounding stroke sensors 29FL and 29FR thus outputs the smaller values of bounding and rebounding stroke indicative sensor signals. As a result, the bounding and rebounding stroke dependent value derivation circuit 31 derives the bounding and rebounding stroke dependent value smaller than $V_1$. Therefore, the subtractor circuit 32 outputs the positive value of the difference indicative signal $\Delta V_1$ as the suspension control signal to the proportioning solenoid 22 of the pressure control valve 18. As a result, the valve spools 19 in the pressure control valves 18 of the front suspension systems 11FL and 11FR are shifted downwardly from the initial position to cause increasing of the fluid pressure in the fluid chamber 15d. Increasing of the fluid pressure in the fluid chambers 15d increases stiffness of the front suspension systems 11FL and 11FR to suppress downward shifting of the front end of the vehicle body.

On the other hand, when nose-dive occurs in the vehicle body, the rear end of the vehicle body is lifted upwardly with expansion of the hydraulic cylinder 15A of the rear suspension systems 11RL and 11RR. This reduces the fluid pressure in the fluid chambers of the hydraulic cylinders 15A. Therefore, the fluid pressure in the outlet ports of the corresponding pressure control valves 18c are reduced to decrease the fluid pressures in the pressure control chambers 18k. Therefore, the spring force of the bias spring 22d overcomes the fluid pressure in the pressure control chamber 18k to cause downward shifting of the valve spool 19. This increases path area for communicating the outlet port 18c with the inlet port 18a to increase the fluid pressure in the fluid chamber 15d. As a result the fluid pressure in the fluid chamber is resumed to the initial pressure value P.

On the other hand, expansion of the hydraulic cylinders 15A in the rear suspension systems 11RL and 18RR causes change of the relative distance between the vehicle body and the suspension member to cause increasing of the bounding and rebounding stroke indicative signal values from that corresponding to the target vehicle height indicative value $V_1$. Therefore, the bounding and rebounding stroke dependent values to be derived by the bounding and rebounding stroke indicative sensor signal value derivation circuits 31 corresponding to the rear suspension systems 11RL and 11RR output increase values of bounding and rebounding stroke dependent value indicative signals. Therefore, the output of the subtractor circuit 32 becomes a negative value to reduce energization magnitude of the solenoid coil 22b to cause upward shifting of the valve spools 19 of the corresponding pressure control valves 18. This causes reduction of the fluid pressure in the fluid chamber 15d of the hydraulic cylinder to suppress the upward motion of the rear end of the vehicle body.

The foregoing operation will be further discussed with reference to the equivalent model of FIG. 7. Here, it is assumed that the mass weight of the vehicle body is M; and the effective area of the hydraulic cylinder is A;

Then, the pressure variation in the fluid chamber 15d may be illustrated by the following equation (1):

$$P_1 - P_0 = K_1 \times V \tag{1}$$

where $P_1$ is a fluid pressure after variation;

$P_0$ is an initial fluid pressure;

$K_1$ is a constant determined according to the characteristics of the pressure control valve; and V is a suspension control signal value.

Assuming the pressure difference $(P_1 - P_0)$ is $\Delta P$, the foregoing equation (1) can be modified to read:

$$\Delta P = K_1 \times V \tag{2}$$

On the other hand, the inertia resistance Mx of the vehicle body corresponds to the resistance of the hydraulic cylinder. Therefore, the relationship between the inertia resistance Mx of the vehicle body and the resistance of the hydraulic cylinder 15A can be illustrated as:

$$Mx = \Delta P \times A \quad (3)$$

On the other hand, the relative distance L between the vehicle body at the elevation $x_2$ and the suspension member at the elevation $x_1$ can be illustrated by the equation (4):

$$L = x_2 - x_1 \quad (4)$$

As set forth above, the suspension control signal value V can be derived from the following equation (5):

$$V = V_1 - Ka \times L \quad (5)$$

Here, if the vehicle level regulation is disregarded and thus the target vehicle height value $V_1$ is zero, the foregoing equation (5) can be modified to:

$$V = -Ka \times L \quad (6)$$

According to the foregoing equations (2), (3) and (4) and (6), the inertia resistance Mx of the vehicle body can be illustrated as:

$$Mx = K_1 \times V \times A \quad (7)$$
$$= K_1 \times -Ka \times (x_2 - x_1) \times A$$

By Laplace conversion, the foregoing equation (7) can be modified to read:

$$MSx = K_1 \times -Ka \times (x_2 - x_1) \times A \quad (8)$$

Based on this, the vibration transmission characteristics X2/X1 of the actively suspension system can be illustrated as:

$$X_2/X_1 = (K_1 \cdot K_a \cdot A)/(MSx^2 + K_1 \cdot K_a \cdot A) \quad (9)$$

Figure 7:
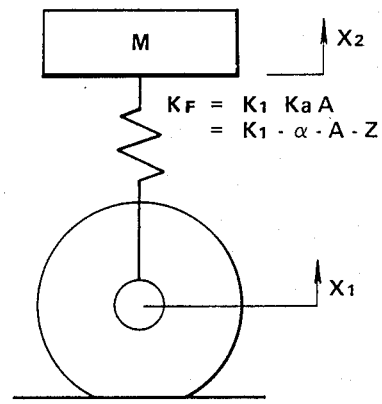
FIG. 7 is an explanatoary illustration of an equivalent model showing kinematic operations of the preferred embodiment of the active suspension system according to the invention.

As will be appreciated from the foregoing equation (9) and the equivalent model in FIG. 7, the hydraulic cylinder in the preferred embodiment of the active suspension system set forth above can facilitate substantially equivalent function to that of the conventional suspension coil spring.

It will be appreciated that, in the shown embodiment, the spring coefficient of the hydraulic cylinder can be illustrated as:

$$K_F = K_1 \times Ka \times A \quad (10)$$

As set forth since the gain value Ka is variable depending upon the set gain value $Z_1$, the spring coefficient can also be illustrated as:

$$K_F = K_1 \times a \times A \times Z \quad (11)$$

Figure 8:
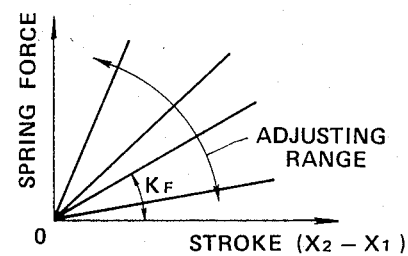
FIG. 8 is a graph showing variation of spring force in releation to the stroke of the relative displacement between the vehicle body and the suspension member.

As will be appreciated herefrom, the spring coefficient of the preferred embodiment of the active suspension system can be adjusted over a wide range by adjusting the set gain indicative value $Z_1$, as seen from FIG. 8.

It should be noted that though the shown embodiment has been constructed to have first and second hydraulic system for improving response characteristics of shock absorbing effect particularly in response to high frequency vibration such as road shock, it should be possible to construct the active suspension system without providing the first hydraulic system so that absorption of the road shock is absorbed by the second hydraulic circuit by shifting of the spool valve in response to bounding and rebounding vibration energy input from the suspension member.

FIG. 9 shows a modified embodiment of the actively controlled suspension system according to the invention. Similarly to the foregoing embodiment, the active suspension system of FIG. 9 includes a feature of regulating vehicular height and whereby suppress the attitude change of the vehicle body. In addition to this, the shown embodiment is provided to facilitate a variable damping characteristics. Especially, the shown embodiment has been directed to provide the active suspension control system in which damping characteristics may be variable by manually setting the desired characteristics. Though the shown embodiment of the active suspension control system performs a variation of the damping characteristics by manual set of the desired damping characteristics, it would be possible to control the damping characteristics automatically according to the vehicle driving condition. In the automatic damping characteristics control, the logic of suspension control as set out in the U.S. Pat. Nos. 4,652,010, 4,600,215 and so forth may be applied. The disclosure of the foregoing United States Patents will be herein incorporated by reference for the sake of disclosure.

In order to provide adjustable damping characteristics, the shown embodiment of the active suspension control system takes the suspension control signal consisting of bounding and rebounding stroke dependent values as derived in the bounding and rebounding stroke dependent value derivation circuit 31 and a bounding and rebounding stroke speed dependent parameter. In order to derive the bounding and rebounding stroke speed dependent value, the controller 30 in the shown embodiment of the suspension control system employs a differentiation circuit 51 for differentiating the bounding and rebounding stroke indicative sensor signal value from the bounding and rebounding stroke indicative sensor 29 to obtain the bounding and rebounding stroke speed, and a bounding and rebounding stroke speed dependent value derivation circuit 52. The bounding and rebounding stroke speed dependent value derivation circuit 52 is connected to the aforementioned differentiation circuit 51 to receive therefrom a bounding and rebounding stroke speed indicative signal therefrom. The bounding and rebounding stroke speed dependent value derivation circuit 52 multiplies the bounding and rebounding stroke speed indicative signal value with a given gain value Kb. The output of the bounding and rebounding stroke speed dependent value derivation circuit 54 is connected to an inverted input terminal of a subtractor 53. The subtractor also has a non-inverting input terminal connected to the output of the subtractor 32. Therefore, the bounding and rebounding stroke speed dependent value as derived by the bounding and rebounding stroke speed dependent value derivation circuit 54 is subtracted from the output value of the subtractor 32.

In the shown embodiment, the bounding and rebounding stroke speed dependent value derivation circuit 52 is provided with a capability of adjusting the gain value Kb. In order to allowable to manual set of the gain value Kb, a manual gain value setting means 54 is connected to the bounding and rebounding stroke speed dependent value derivation circuit 52. The manual gain value setting means 54 is manually operable to set a set value $Z_2$ for determining the gain value Kb. According to the set value $Z_2$, the gain value Kb is variable in linear fashion with a coefficient $\alpha_2$ as shown in FIG. 10.

As will be seen from FIG. 9, the shown embodiment of the active suspension control system performs the bounding and rebounding stroke dependent vehicle height control in a manner substantially same as that discussed in the former embodiment. In addition to this, the shown embodiment of the active suspension control system performs damping characteristics adjustment.

In the damping characteristics adjustment operation, while the vehicle travels on a smooth road, substantially no change in relative distance between the vehicle body and the suspension member and thus the bounding and rebounding stroke indicative sensor signal value is held constant. Therefore, the bounding and rebounding stroke speed indicating value as derived in the differentiation circuit 51 is held substantially zero. As long as the bounding and rebounding stroke speed indicating value is held at zero, the bounding and rebounding stroke speed dependent value as derived in the bounding and rebounding stroke speed dependent value derivation circuit 52 become zero. At this time, since no relative displacement between the vehicle body and the suspension member is detected by the stroke sensor 29, the actual vehicle height as represented by the bounding and rebounding stroke indicating sensor signal value is substantially maintained at the target vehicle height level as represented by the target vehicle height indicative signal value $V_1$. Therefore, output of the bounding and rebounding stroke dependent value derivation circuit 31 is held substantially $V_1$. As a result, the output of the bounding and rebounding stroke dependent value derivation circuit 31 is held at a value corresponding to the target vehicle height indicating value $V_1$. Therefore, the subtractor output from the subtractor circuit 32 becomes zero. Therefore, the pressure control valve 18 is held in place where the hydraulic force created by the fluid pressure in the fluid chamber 15d of the hydraulic cylinder 15A balances with the mass weight of the vehicle body as applied to the suspension system to maintain the vehicle height at the target vehicle height as represented by the target vehicle height indicative signal value $V_1$.

On the other hand, if the vehicular attitude changes by vehicular pitching, rolling, bouncing and so forth, the bounding and rebounding stroke indicative sensor signal value varies according to relative displacement between the vehicle body and the suspension member. For example, similarly to the foregoing embodiment, if nose-dive occurs due to vehicular braking operation, the front end of the vehicle body is lowered compressing the hydraulic cylinders to increase the fluid pressure in the fluid chamber. This causes the working fluid in the fluid chamber to flow back to the outlet port 18c of the pressure control valve 18 to cause increasing of the fluid pressure in the pressure control chamber 18k. Increasing the fluid pressure in the pressure control chamber 18k overcomes the spring force of the bias spring 22d to allow upward shifting of the valve spool 19, in FIG. 2, to establish communication between the outlet port 18c and the drain port 18b to drain the increased pressure to the fluid reservoir 21. Therefore, the fluid pressure in the upper fluid chamber 15d can be maintained at the set pressure P which balances with the spring force of the bias spring 22d.

At the same time, lowering of the front end of the vehicle body is detected by the bounding and rebounding stroke sensors 29FL and 29FR. The bounding and rebounding stroke sensors 29FL and 29FR thus outputs the smaller values of bounding and rebounding stroke indicating sensor signals. As a result, the bounding and rebounding stroke dependent value derivation circuit 31 derives the bounding and rebounding stroke dependent value smaller than $V_1$. Therefore, the subtractor circuit 32 outputs the positive value of the difference indicative signal $\Delta V_1$ as the suspension control signal to the proportioning solenoid 22 of the pressure control valve 18. As a result, the valve spools 19 in the pressure control valves 18 of the front suspension systems 11FL and 11FR are shifted downwardly from the initial position to case increasing of the fluid pressure in the fluid chamber 15d. Increasing the fluid pressure in the fluid chambers 15d increases stiffness of the front suspension systems 11FL and 11FR to suppress downward shifting of the front end of the vehicle body. Simultaneously, the differentiation circuit 51 derives the bounding and rebounding stroke speed indicating value based on the variation magnitude of the bounding and rebounding stroke indicative sensor signal values. In this case, since the relative displacement occurs to approach the vehicle body and suspension member to each other, the bounding and rebounding stroke speed indicating value becomes the negative value. Based on the derived bounding and rebounding stroke speed indicating value, the bounding and rebounding stroke speed dependent value derivation circuit 52 derives the bounding and rebounding stroke speed dependent value. Since the input to the bounding and rebounding stroke speed dependent value derivation circuit 52 is negative, the derived bounding and rebounding stroke speed dependent value to be derived in the bounding and rebounding stroke speed dependent value derivation circuit becomes negative. This value is subtracted from the output of the subtractor circuit 32 in the subtractor 53. At this time, since the input value from the bounding and rebounding stroke speed dependent value derivation circuit 52 is a negative value, output value of the bounding and rebounding stroke speed dependent value derivation circuit is indeed added to the output value of the subtractor circuit 32 to increase the control magnitude than that in the former embodiment. The output of the subtractor circuit 53 serves as the suspension control signal for adjusting the fluid pressure in the front suspension systems 11FL and 11FR can be adjusted.

On the other hand, when nose-dive occurs in the vehicle body, the rear end of the vehicle body is lifted upwardly with expansion of the hydraulic cylinder 15A of the rear suspension systems 11RL and 11RR. This reduces the fluid pressure in the fluid chambers of the hydraulic cylinders 15A. Therefore, the fluid pressure in the outlet ports of the corresponding pressure control valves 18c are reduced to decrease the fluid pressures in the pressure control chambers 18k. Therefore, the spring force of the bias spring 22d overcomes the fluid pressure in the pressure control chamber 18k to cause downward shifting of the valve spool 19. This increases path area for communicating the outlet port 18c with the inlet port 18a to increase the fluid pressure in the fluid chamber 15d. As a result the fluid pressure in the fluid chamber is resumed to the initial pressure value P.

On the other hand, expansion of the hydraulic cylinders 15A in the rear suspension systems 11RL and 18RR causes change of the relative distance between the vehicle body and the suspension member to cause increasing of the bounding and rebounding stroke indicating signal values from that corresponding to the target vehicle height indicative value $V_1$. Therefore, the bounding and rebounding stroke dependent values to be derived by the bounding and rebounding stroke indicating sensor signal value derivation circuits 31 corresponding to the rear suspension systems 11RL and 11RR output increase values of bounding and rebounding stroke dependent value indicative signals. Therefore, the outputs of the subtractor circuit 32 becomes negative value to reduce energization magnitude of the solenoid coil 22b to cause upward shifting of the valve spools 19 of the corresponding pressure control valves 18. This causes reduction of the fluid pressure in the fluid chamber 15d of the hydraulic cylinder to suppress the upward motion of the rear end of the vehicle body. Simultaneously, the differentiation circuit 51 derives the bounding and rebounding stroke speed indicating value based on the variation magnitude of the bounding and rebounding stroke indicative sensor signal values. In this case, since the relative displacement occurs on the vehicle body and suspension member to move away from each other, the bounding and rebounding stroke speed indicating value becomes the positive value. Based on the derived bounding and rebounding stroke speed indicative value, the bounding and rebounding stroke speed dependent value derivation circuit 52 derives the bounding and rebounding stroke speed dependent value. Since the input to the bounding and rebounding stroke speed dependent value derivation circuit 52 is negative, the derived bounding and rebounding stroke speed dependent value to be derived in the bounding and rebounding stroke speed dependent value derivation circuit becomes positive. This value is subtracted from the output of the subtractor circuit 32 in the subtractor 53. At this time, since the input value from the bounding and rebounding stroke speed dependent value derivation circuit 52 is positive value, output value of the bounding and rebounding stroke speed dependent value derivation circuit is subtracted from the output value of the subtractor circuit 32 to decrease the control magnitude than that in the former embodiment.

An equivalent model to the foregoing modified embodiment of the active suspension system has been illustrated in FIG. 11. Assuming the bounding and rebounding stroke speed indicating value is Vs, the suspension control signal can be illustrated by the following equation (12):

$$V = -Ka \cdot L - Kb \cdot Vs \qquad (12)$$

The equation (12) can be modified utilizing the equations (2) and (4) as:

$$\begin{aligned} Mx &= K_1 - Kb \times (x_2 - x_1) + \\ & \quad Kb \cdot (V_{s1} - V_{s0}) \times A \\ &= -K_1 \cdot Ka \cdot A \cdot (x_2 - x_1) - \\ & \quad K_1 \cdot Kb \cdot A \cdot (V_{s1} - V_{s0}) \end{aligned} \qquad (13)$$

where $V_{s1}$ is bounding and rebounding stroke indicating value after relative displacement;

$V_{s0}$ is bounding and rebounding stroke indicating value before relative displacement.

This equation can be modified by Laplace conversion as:

$$MS^2 x_2 = -K_1 \cdot Ka \cdot A \cdot (x_2 - x_1) - K_1 \cdot Kb \cdot A \cdot (Sx_2 - Sx_1) \qquad (14)$$

Based on this, the vibration transmission characteristics $X_2/X_1$ can be illustrated:

$$X_2/X_1 = (K_1 \cdot Kb \cdot A \cdot S + K_1 \cdot Ka \cdot A)/(MS^2 + K_1 \cdot Kb \cdot A \cdot S + K_1 \cdot Ka \cdot A \cdot S) \qquad (15)$$

Therefore, the shown embodiment can exhibit the equivalent characteristics as the traditional suspension system which has a shock absorber and a suspension coil spring.

In this case, assuming the damping coefficient to be generated by the hydraulic cylinder is $C_F$, the $C_F$ and $K_F$ can be illustrated as:

$$C_F = K_1 \cdot Kb \cdot A \qquad (16)$$

$$K_F = K_1 \cdot Ka \cdot A \qquad (17)$$

As set forth, since the Ka and Kb are set as functions of the set values $Z_1$ and $Z_2$ with constants $\alpha_1$ and $\alpha_2$, the foregoing equations (16) and (17) are modified as:

$$C_F = K_1 \cdot Kb \cdot \alpha_2 \cdot A \qquad (18)$$

$$K_F = K_1 \cdot Ka \cdot \alpha_1 \cdot A \qquad (19)$$

Therefore, by providing the factor of adjustment of damping characteristics in addition to bounding and rebounding stroke control, and providing capability of adjustment of gain values Ka and Kb as a functions of the manually set values $Z_1$ and $Z_2$, windrange and delicate suspension control can be accomplished.

Though the embodiments has been disclosed for suppressing the attitude change of the vehicle body by adjusting the vehicle height, it should be possible to adjust only damping characteristics in response to the bounding and rebounding strokes of the hydraulic cylinder. Furthermore, though the stroke sensor comprises the potentiometer in the shown embodiment, any appropriate sensors, such as differential transducer, ultrasonic distance sensor and so forth, may be applicable. In addition, the hydraulic cylinder may be replaced with any appropriate suspension element, such as pneumatic cylinders hydropneumatic cylinders and so forth.

What is claimed is:

1. An actively controlled suspension system comprising:

a fluid pressure means interposed between a vehicle body and a suspension member rotatably supporting a road wheel, said fluid pressure means having variable pressure chamber;

a sensor means for monitoring relative distance between said vehicle body and said suspension member for producing a sensor signal indicative thereof;

a controller receiving said sensor signal and deriving a control signal based on said sensor signal value and a given value for adjusting the fluid pressure in said variable pressure chamber in order to maintain said relative distance between said vehicle body and said suspension member at a predetermined value; and means, associated with said controller, for varying said given value according to a set value thereof, said set value being set for adjusting said given value in proportion to said set value in linear fashion so that said control signal value can be varied linearly according to variation of the given value.

2. An actively controlled suspension system as set forth in claim 1, wherein said fluid pressure means comprises:

a fluid cylinder enclosing a thrusting piston, said fluid cylinder being rigidly connected to one of said vehicle body and said suspension member, said piston being connected to the other of said vehicle body and said suspension members via a piston rod, and said variable pressure chamber being defined by said fluid cylinder and said piston;

a fluid pressure source; and a pressure control valve disposed between said variable pressure chamber and said fluid pressure source, said pressure control valve being responsive to said control signal to adjust the fluid pressure in said variable pressure chamber.

3. An actively controlled suspension system as set forth in claim 2, wherein said controller detects relative displacement from a predetermined reference position between said vehicle body and said suspension member for deriving said control signal value to adjust the fluid pressure in said variable pressure chamber for reducing said relative displacement to zero.

4. An actively controlled suspension system as set forth in claim 3, wherein said controller derives a spring coefficient indicative value based on said sensor signal for deriving said control signal value based thereon for adjusting spring characteristics of the suspension system.

5. An actively controlled suspension system as set forth in claim 1, wherein said given value varying means is manually operable for adjusting said given value.

6. An actively controlled suspension system, comprising:

a fluid pressure means interposed between a vehicle body and a suspension member rotatably supporting a road wheel, said fluid pressure means having a variable pressure chamber;

sensor means for monitoring relative distance between said vehicle body and said suspension member for producing a sensor signal indicative thereof;

a controller receiving said sensor signal and deriving a control signal based on said sensor signal value and a given value for adjusting the fluid pressure in said variable pressure chamber in order to maintain said relative distance between said vehicle body and said suspension member at a predetermined value; and means associated with said controller, for varying said given value according to a set value thereof, said set value being set for adjusting said given value in proportion to said set value in linear fashion so that said control signal value can be varied linearly according to variation of the given value; and wherein said fluid pressure means comprises a fluid cylinder enclosing a thrusting piston, said fluid cylinder being rigidly connected to one of said vehicle body and said suspension member, said piston being connected to the other of said vehicle body and said suspension members via a piston rod, and said variable pressure chamber being defined by said fluid cylinder and said piston; a fluid pressure source; and a pressure control valve disposed between said variable pressure chamber and said fluid pressure source, said pressure control valve being responsive to said control signal to adjust the fluid pressure in said variable pressure chamber;

said controller detects relative displacement from a predetermined reference position between said vehicle body and said suspension member for deriving said control signal value to adjust the fluid pressure in said variable pressure chamber for reducing said relative displacement to zero; and said controller derives a damping coefficient indicative value based on said sensor signal for deriving said control signal value based thereon to adjust damping characteristics of the suspension system.

7. An actively controlled suspension system comprising:

a fluid pressure means interposed between a vehicle body and a suspension member rotatably supporting a road wheel, said fluid pressure means having a variable pressure chamber;

sensor means for monitoring relative distance between said vehicle body and said suspension member for producing a sensor signal indicative thereof;

a controller receiving said sensor signal and deriving a control signal based on said sensor signal value and a given value for adjusting the fluid pressure in said variable pressure chamber in order to maintain said relative distance between said vehicle body and said suspension member at a predetermined value; and means, associated with said controller, for varying said given value according to a set value thereof, said set value being set for adjusting said given value continuously so that said control signal value can be varied according to variation of the given value.

8. An actively controlled suspension system comprising:

a fluid pressure means interposed between a vehicle body and a suspension member rotatably supporting a road wheel, said fluid pressure means having a variable pressure chamber;

sensor means for monitoring relative distance between said vehicle body and said suspension member for producing a sensor signal indicative thereof;

a controller receiving said sensor signal and deriving a control signal based on said sensor signal value and a given value for adjusting the fluid pressure in said variable pressure chamber in order to maintain said relative distance between said vehicle body and said suspension member at a predetermined value, and said controller having at least one of a relative displacement dependent value derivation circuit for deriving relative displacement dependent value indicating sensor signals and a relative speed dependent value derivation circuit for deriving relative speed dependent value indicating sensor signals, and said controller deriving said control signal in order to operate said fluid pressure means in which at least one of an associated spring coefficient and damping coefficient can be continuously varied according to variation of the given value.

9. An actively controlled suspension system comprising:
- a fluid pressure means interposed between a vehicle body and a suspension member rotatably supporting a road wheel, said fluid pressure means having a variable pressure chamber;
- sensor means for monitoring relative distance between said vehicle body and said suspension member for producing a sensor signal indicative thereof;
- a controller receiving said sensor signal and deriving a control signal based on said sensor signal value and a given value for adjusting the fluid pressure in said variable pressure chamber in order to maintain said relative distance between said vehicle body and said suspension member at a predetermined value, and said controller having at least one of a bounding and rebounding stroke dependent value derivation circuit for deriving a bounding and rebounding stroke dependent value indicating sensor signals and a bounding and rebounding stroke speed dependent value derivation circuit for deriving a bounding and rebounding stroke speed dependent value indicating sensor signals, and said controller deriving said control signal in order to operate said fluid pressure means in which at least one of an associated spring coefficient and damping coefficient can be continuously varied according to variation of the given value.

* * * * *